United States Patent [19]

Hakamada et al.

[11] Patent Number: 4,845,564
[45] Date of Patent: Jul. 4, 1989

[54] TELEVISION RECEIVER INCORPORATING A VIDEO CASSETTE RECORDER AND CAPABLE OF DISPLAYING A SUB-CHANNEL PICTURE WITHIN A MAIN-CHANNEL PICTURE

[75] Inventors: Kunio Hakamada, Tokyo; Shizuo Hanamura, Saitama; Osamu Oda, Tokyo; Toshio Amano, Kanagawa, all of Japan

[73] Assignee: Sony Corp., Tokyo, Japan

[21] Appl. No.: 176,199

[22] Filed: Mar. 31, 1988

[30] Foreign Application Priority Data

Apr. 16, 1987 [JP] Japan .................................. 62-93573

[51] Int. Cl.⁴ ...................... H04N 5/272; H04N 5/268
[52] U.S. Cl. ..................................... 358/183; 358/181
[58] Field of Search ................. 358/183, 22, 181, 182, 358/180, 335; 360/33.1

[56] References Cited

U.S. PATENT DOCUMENTS

| | | | |
|---|---|---|---|
| 4,031,548 | 6/1977 | Kato et al. ...................... | 360/33.1 X |
| 4,182,991 | 1/1980 | Amano ........................... | 360/33.1 X |
| 4,267,563 | 5/1981 | Sato et al. ......................... | 358/335 |
| 4,272,784 | 6/1981 | Saito et al. ........................ | 358/335 |
| 4,682,234 | 7/1987 | Naimpally ......................... | 358/183 |
| 4,725,888 | 2/1988 | Hakamada ......................... | 358/183 |
| 4,729,027 | 3/1988 | Hakamada et al. ................ | 358/183 |
| 4,761,688 | 8/1988 | Hakamada ......................... | 358/22 X |
| 4,768,110 | 8/1988 | Dunlap et al. ..................... | 358/181 |

FOREIGN PATENT DOCUMENTS

| | | | |
|---|---|---|---|
| 53-114411 | 10/1978 | Japan .................................. | 358/335 |
| 55-118277 | 9/1980 | Japan .................................. | 358/183 |
| 56-73978 | 6/1981 | Japan .................................. | 358/183 |
| 57-26972 | 2/1982 | Japan .................................. | 358/183 |
| 2059703 | 4/1981 | United Kingdom ................. | 358/22 |

*Primary Examiner*—James J. Groody
*Assistant Examiner*—E. Anne Faris
*Attorney, Agent, or Firm*—Alvin Sinderbrand

[57] ABSTRACT

A television receiver incorporating a video cassette recorder and having a display, for example, a picture screen, for showing a main-channel picture within which a sub-channel picture may be superimposed, includes first and second tuners which are independently controllable for each selecting one of a number of broadcast channels, with the video signal broadcast on the channel selected by the first tuner being supplied to the display for forming the main-channel picture while the video signal broadcast on the channel selected by the second tuner is supplied to the display for forming the sub-channel picture in a sub-channel picture display mode of the receiver, and a system controller is programmed so that, when initiating a recording mode of the video cassette recorder, the second tuner is made to select the same broadcast channel as the first tuner.

7 Claims, 4 Drawing Sheets

TELEVISION RECEIVER INCORPORATING A VIDEO CASSETTE RECORDER AND CAPABLE OF DISPLAYING A SUB-CHANNEL PICTURE WITHIN A MAIN-CHANNEL PICTURE

BACKGROUND OF THE INVENTION

1. Field of the Invention

This invention relates generally to television receivers and, more particularly, is directed to a picture-within-a picture-type television receiver incorporating a video cassette recorder.

2. Description of the Prior Art

Generally, a video cassette recorder (VCR) having a tuner circuit for selecting a channel and a television receiver are constructed independently of each other. When in use, the VCR and television receiver are connected so that a program on a desired channel may be recorded by the VCR while such program is also being displayed on the picture screen of the television receiver, or so that a program on one channel can be recorded while a program on a different channel is displayed on the picture screen. Since the VCR and the television receiver are constructed independently of each other, the user rarely confuses the channel selection section of the VCR with the channel selection section of the television receiver. Accordingly, the user is not likely to confuse the channel of the program to be received and displayed by the television receiver and the channel of the program to be recorded on the VCR. Thus, the operations for reproducing or displaying and for recording the desired television programs can be readily controlled.

When the so-called deck type VCR, which does not have an independent tuner circuit, and a television receiver are combined as a unitary structure, such unitary or combined structure is provided with only a single tuner circuit, and the program on the channel being displayed by the picture screen can be recorded by the VCR in response to the mere actuation of a recording switch, for example, as disclosed in Japanese Published Pat. Application No. 61-11510. Such arrangement has the virtue of being operationally simple, but it suffers the disadvantage of permitting recording of only the program that is being displayed on the picture screen.

It has further been proposed to provide a so-called split-screen or picture-within-a picture type television receiver in which a sub-channel picture is superimposed on, or displayed as an inset within a main-channel picture. When such split-screen television receiver is combined with the previously mentioned deck-type VCR, the combined apparatus is provided with a tuner circuit for the main-channel picture and a tuner circuit for the sub-channel picture. If such combined apparatus is arranged so that the video signal corresponding to the main-channel picture is recorded by the VCR upon actuation of a recording switch, the operation of the combined apparatus is facilitated, but the VCR integrated with the split-screen television receiver can not record a program broadcast on a channel different from that on which the main-channel picture appears. In other words, the VCR integrated with the split-screen television receiver can not record a video signal corresponding to the sub-channel picture while the main-channel picture is displayed on the screen of the television receiver.

In order to avoid the above defect, the combination of a split-screen television receiver with a VCR has been modified so that the VCR records the video signal corresponding to the sub-channel picture whenever a recording switch is actuated. In this modified combined apparatus, the main-channel picture corresponding to the program on one channel can be displayed on the screen of the television receiver while the VCR records a program on a different channel, that is, the channel providing the sub-channel picture. However, in the split-screen television receiver, the sub-channel picture is only displayed in response to a respective control signal provided at the will of the user. Therefore, if such control signal has not been provided for display of the sub-channel picture, the program being recorded can not be readily monitored or confirmed.

It is also known to provide a split-screen or picture-within-a picture type television receiver incorporating a VCR with a switch or control for selecting either the video signal corresponding to main-channel picture or the video signal corresponding to the sub-channel picture to be recorded by the VCR. However, here again, since the sub-channel picture is not always displayed, the content of the program being recorded can not be always monitored or confirmed with any degree of certainty. Moreover, when the split-screen television receiver and VCR are combined in a unitary structure or common cabinet and the various operation controlling switches are all provided at the front panel of such cabinet, the user is likely to become confused as to the correspondence between the program being recorded and the program forming the main-channel picture and/or the sub-channel picture.

In an attempt to avoid such confusion, consideration has also been given to an arrangement in which, when only a main-channel picture is displayed on the screen of the television receiver, the program recorded corresponds to such main-channel picture, whereas, when the television receiver is controlled to simultaneously display a main-channel picture and a sub-channel picture, the program corresponding to the sub-channel picture is the one which is recorded. However, a split-screen television receiver having the foregoing arrangement is relatively difficult to program and operate.

OBJECTS AND SUMMARY OF THE INVENTION

Accordingly, it is an object of the present invention to provide an improved television receiver incorporating a video cassette recorder and having a display for showing a main-channel picture within which a sub-channel picture may be superimposed, and which avoids the above mentioned disadvantages of the prior art.

It is another object of the present invention to provide a television receiver incorporating a video cassette recorder and having a display for showing a main-channel picture within which a sub-channel picture may be superimposed, and in which, in initiating a recording mode of the video cassette recorder, a predetermined channel selection is automatically effected for readily ensuring that the desired program material will be recorded.

It is a further object of the present invention to provide a television receiver incorporating a video cassette recorder, as aforesaid, and in which, in a recording pause mode of the video cassette recorder, a video signal received by the video cassette recorder is employed for forming a sub-channel picture which is displayed whether or not a sub-channel picture has been displayed prior to establishment of the recording pause mode.

In accordance with an aspect of this invention, a television receiver incorporating a video cassette recorder and having display means for showing a main-channel picture within which a sub-channel picture may be superimposed, comprises: independently operable first and second tuner circuit means for each selectively tuning to one of a plurality of channels on which respective video signals are broadcast; signal conveying and processing means interposed between each of the first and second tuner circuit means and the display means for supplying to the latter processed signals corresponding to video signals broadcast on the channels to which the first and second tuner circuit means are respectively tuned and thereby forming the main-channel picture and the sub-channel picture; control switch means actuable for selecting the channels to which the first and second tuner circuit means are respectively tuned and for establishing respective operating modes of the video cassette recorder and of the signal conveying and processing means; and system controller means responsive to the control switch means for providing channel control signals to the first and second tuner circuit means, respectively, and mode control signals to the signal conveying and processing means and to the video cassette recorder, the system controller means being programmed to provide to the second tuner circuit means a channel control signal which is the same as the channel control signal provided to the first tuner circuit means in response to initiation of a recording mode of the video cassette recorder and to convey to the video cassette recorder, in the recording mode, the video signal broadcast on the channel to which the second tuner circuit means is tuned by the respective channel control signal.

In accordance with another aspect of this invention, the above mentioned signal conveying and processing means has an exclusively main-channel picture mode and a combined main-channel and sub-channel picture mode, and the system controller means is further programmed so that, when initiating the recording mode, the signal conveying and processing means supplies to the display means, for forming the sub-channel picture, the processed signals corresponding to the video signal broadcast on the channel to which the second tuner circuit means is tuned whether the signal conveying and processing means is initially in the exclusively main-channel picture mode or in the combined-picture mode.

In accordance with still another aspect of this invention, the aforesaid system controller means is further programmed so that, in establishing a recording pause mode of the video cassette recorder, the signal conveying and processing means supplies to supply to the display means, for forming the sub-channel picture, the processed signals corresponding to the video signal broadcast on the channel to which the second tuner circuit means is tuned whether the exclusively main-channel picture mode or the combined picture mode was previously established.

The above, and other objects, features and advantages of the invention, will become apparent in the following detailed description of illustrative embodiments of the invention which are to be read in conjunction with the accompanying drawings wherein the same or similar parts are identified by the same reference numerals in the several views of the drawings.

BRIEF DESCRIPTION OF THE DRAWINGS

FIGS. 3A-I, 3A-II and 3A-III and FIGS. 3B-I, 3B-II and 3B-III are schematic views representing the screen of a cathode ray tube or display of the television receiver in FIG. 1, and illustrating the manner in which a sub-channel picture in superimposed relation to a main-channel picture, or a main-picture alone, are displayed in various different operating conditions;

DETAILED DESCRIPTION OF PREFERRED EMBODIMENTS

Figure 1:
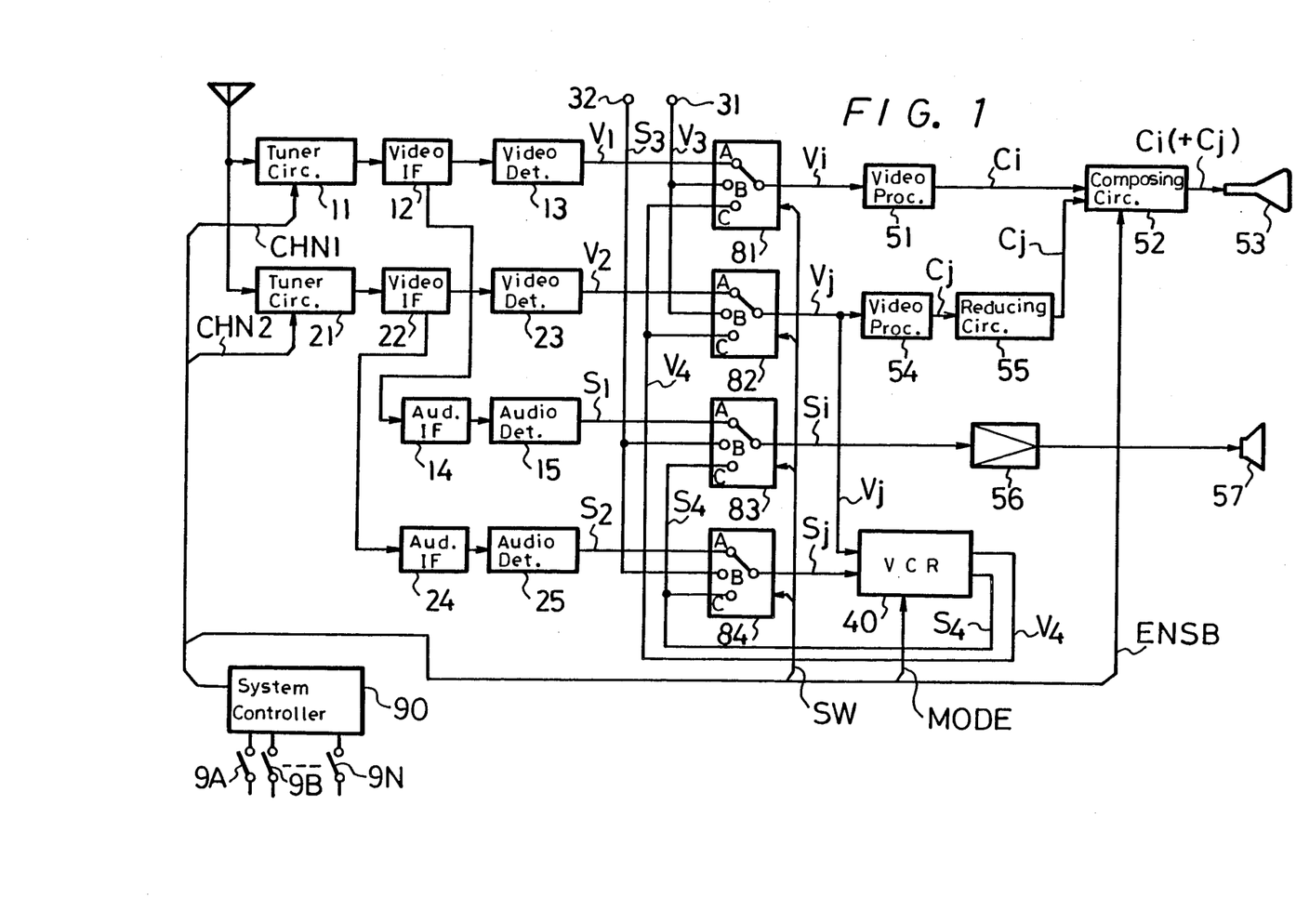
FIG. 1 is a block diagram showing a television receiver incorporating a video cassette recorder in accordance with an embodiment of the present invention and which is capable of displaying a main-channel picture within which a sub-channel picture may be superimposed.

Referring to the drawings in detail, and initially to FIG. 1 thereof, it will be seen that a split-screen or picture-within-a picture television receiver 10 in accordance with an embodiment of this invention includes a system controller 90 which may be constituted by a microcomputer having a central processing unit (CPU) and being provided with various operation control switches 9A, 9B,-9N which are selectively actuable by the user of the television receiver. When the operation control switches 9A, 9B,-9N are selectively actuated, the system controller 90 produces corresponding control signals which are supplied to respective circuits, as will be hereinafter described in detail.

The television receiver 10 is further shown to generally include first and second tuner circuits 11 and 21 which are desirably of the electronic tuning type so as to respond to channel selection control signals CHN1 and CHN2, respectively, from the system controller 90 for causing the tuner circuits 11 and 21 to be tuned to selected respective channels and to deliver corresponding video intermediate frequency signals. The video intermediate frequency signals from the tuner circuits 11 and 21 are supplied through video intermediate frequency amplifiers 12 and 22, respectively, to video detector circuits 13 and 23 by which there are provided composite color vide signals $V_1$ and $V_2$ representing the programs or pictures broadcast on the channels selected by the first and second tuner circuits 11 and 21, respectively.

The intermediate frequency amplifiers 12 and 22 also provide sound intermediate frequency signals through sound intermediate frequency amplifiers 14 and 24 to audio detector circuits 15 and 25, respectively. The audio detector circuits 15 and 25 derive audio signals S1 and S2 representing the audio or sounds being broadcast on the channels selected by the first and second tuner circuits 11 and 21, respectively.

External input terminals 31 and 32 are provided for receiving a color video signal V3 and an audio signal S3, respectively, from an external signal source, such as, for example, a video disc player (not shown).

A video cassette recorder (VCR) 40 is incorporated in the television receiver 10 as a unitary part thereof and may be, for example, an 8mm video tape recorder or the like. The VCR 40 has various operating modes, such as, a stop mode, a recording mode, a recording pause mode and a reproducing or playback mode, each of which is established in response to a respective operation mode control signal MODE provided by the system controller 90 when a respective one of the control switches 9A, 9B,-9N is actuated. In its reproducing or playback mode, the VCR 40 provides an output color video signal V4 and an output audio signal S4.

Source selector switching circuits 81, 82, 83 and 84 are each provided with three inputs or fixed contacts A, B and C and with a respective movable contact constituting an output. The video signals V1 and V2 from video detectors 13 and 23 are supplied to the inputs A of switching circuits 81 and 82, respectively, and the video signal V3 from the external source is supplied to the inputs B of both switching circuits 81 and 82. The output or reproduced video signal V4 from the VCR 40 is applied to the inputs C of both switching circuits 81 and 82. The movable contacts of the switching circuits 81 and 82 are positioned in response to switch control signals SW provided by the system controller 90 upon actuation of respective ones of the control switches 9A, 9B,-9N so as to suitably change or select the contents of output video signals Vi and Vj obtained at the outputs of switching circuits 81 and 82, respectively.

The switching circuits 83 and 84 select the sources of the audio or sound signals Si and Sj, respectively, output therefrom, and are similarly controlled by switch control signals SW from the system controller 90. The switching circuits 83 and 84 are shown to have their inputs A connected to receive the audio signals S1 and S2 from the audio detectors 15 and 25, respectively. The inputs B of the switching circuits 83 and 84 are both connected to receive the audio signal S3 from the external source, and the inputs C of the switching circuits 83 and 84 are both connected to receive the output or reproduced audio signal V4 from the VCR 40.

It will be appreciated that the switching circuits 81 and 82 respond to the switching control signals SW from the system controller 90 to selectively derive video signal Vi from among the video signals V1, V3 and V4, and to selectively derive the video signal Vj from among the video signals V2, V3 and V4. In a similar manner, the switching circuits 83 and 84 respond to the control signals SW to selectively derive their output audio signals Si and Sj from among the audio signals S1, S3 and S4, and from among the audio signals S2, S3 and S4, respectively.

Video signal processing circuits 51 and 54 for processing a luminance signal Y and a chrominance signal C receive the signals Vi and Vj from the switching circuits 81 and 82, respectively, and provide therefrom three-primary color signals Ci and Cj, respectively. The signal Ci is supplied directly to a composing circuit 52, and the signal Cj is supplied through a reducing circuit 55 to the composing circuit 52. The reducing circuit 55, although not shown in detail, may include an analog-to-digital converter, a memory, a digital-to-analog converter and the like suitable to convert the signal Cj representing a picture dimensioned to fill the screen of color picture tube into a signal representing a sub-channel or inset picture. The composing circuit 52 responds to a suitable control signal ENSB from the system controller 90 to output only the signal Ci supplied thereto for an exclusively main-channel picture mode in which only the main-channel picture is to be displayed. On the other hand, when the control signal ENSB from the system controller 90 is conditioned to establish a combined-picture mode, that is the mode in which both the main-channel picture and the sub-channel picture are to be simultaneously displayed, the composing circuit 52 produces a signal (Ci and Cj) composed of the signals Ci and Cj.

The output signal from the composing circuit 52 is supplied to a color picture or cathode ray tube 53 for display at the screen thereof, and the signal Si from the switching circuit 83 is supplied through an audio amplifier 56 to a loud speaker 57. The signals Vj and Sj from the outputs of switching circuits 82 and 84 are supplied to the VCR 40 as the video and audio signals to be recorded by the latter.

Figure 2:
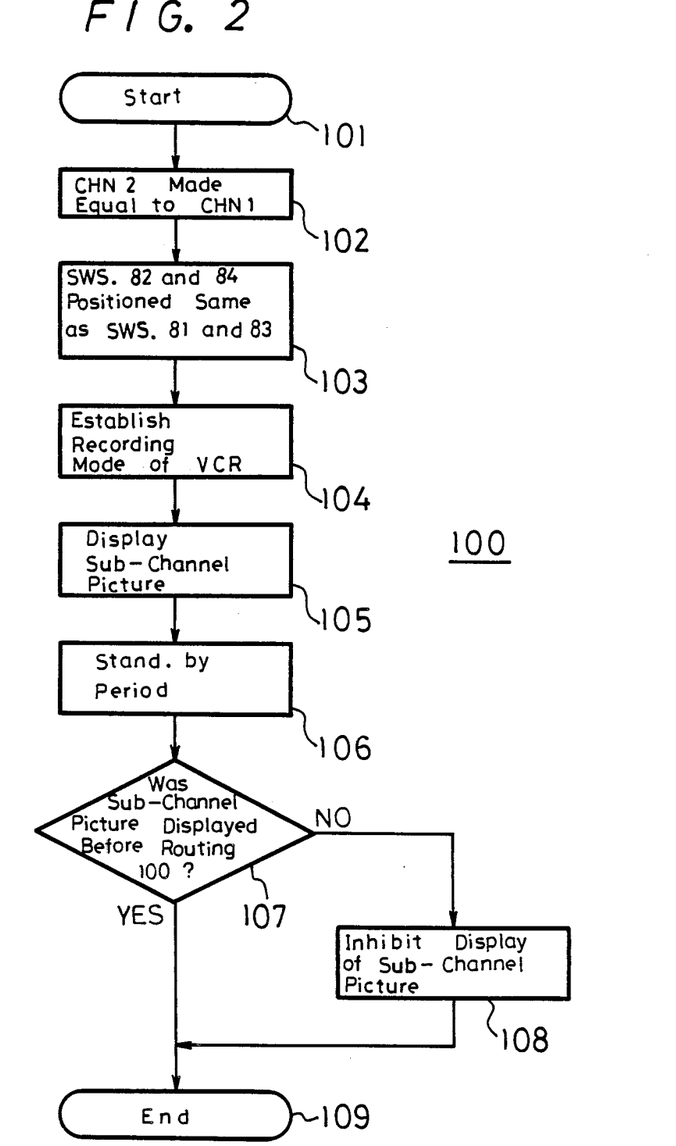
FIG. 2 is a flow chart to which reference will be made in explaining initiating of the recording mode of the video cassette recorder incorporated in a television receiver according to the embodiment of the invention shown on FIG. 1.

The microcomputer included in the system controller 90 may include a read only memory (ROM) which stores a recording routine 100, for example, as represented by the flow chart on FIG. 2.

With the above described arrangement, when the signal ENSB is in the state to inhibit the composing circuit 52 from composing the signal Cj with the signal Ci, that is, when only the main-channel picture is to be displayed, the source of such main-channel picture is and of the associated sound determined by the positions of the switching circuits 81 and 83 in response the control signals SW from the system controller 90, as indicated in TABLE I below:

TABLE I

| Connected positions of switching circuits 81 and 83 | V1 | Si | Ci | Source of Main-channel picture |
|---|---|---|---|---|
| Contact A | V1 | S1 | C1 | Picture on a channel selected by tuner 11 |
| Contact B | V3 | S3 | C3 | Reproduced picture of external input |
| Contact C | V4 | S4 | C4 | Picture reproduced by VCR 40 |

It will be seen that, when switching circuits 81 and 83 engage their respective contacts A, the signals V1 and S1 are selected as the signals Vi and Si, respectively, with the result that the picture and sound constituting a program on a desired one of the broadcast television channels can be displayed and heard in accordance with the control of the tuner circuit 11 by the channel selection control signal CHN1 from the system controller 90.

Similarly, when control signals SW from system controller 90 cause switching circuits 81 and 83 to engage their respective contacts B, the video signal V3 and audio signal S3 from the external source are supplied as the signals Vi and Si so that the picture tube or display 53 and loud speaker 57 reproduce the picture and sound from the external source, for example, the picture and sound being reproduced by a video disc player.

When switching circuits 81 and 83 are made to engage their contacts C, it will be seen that the video signal V4 and audio signal S4 being reproduced by the VCR 40 are selected as the signals Vi and Si. When the control signal ENSB from the system controller 90 is in the state to cause operation of the composing circuit 52 for composing the signal Cj with the signal Ci, that is, when a combined picture mode is selected to display both the main-channel picture and the sub-channel picture superimposed therein, the sources of the signals Vj and Sj for forming the sub-channel picture and corresponding audio are selected in dependence upon the positions of the switching circuits 82 and 84, as shown in TABLE 2 below:

TABLE 2

| Connected positions of switching circuits 82 and 84 | Vj | Sj | Cj | Source of Sub-channel picture |
|---|---|---|---|---|
| Contact A | V2 | S2 | C2 | Picture on a channel selected by tuner 21 |
| Contact B | V3 | S3 | C3 | Reproduced Picture of external input |
| Contact C | V4 | S4 | C4 | Picture reproduced by VCR 40 |

It will be appreciated from the above that, in all positions of the switches 82 and 84, as determined by the control signals SW, a video signal V2, V3 or V4 is supplied as the signal Vj for display as the sub-channel picture on the screen of tube 53. When the switch 82 is positioned to engage its contact A, the video signal V2 corresponds to the video portion of a program being received on a selected one of the broadcasting television channels as determined by the tuner circuit 21 in response to the channel selection control signal CHN2.

When switching circuits 82 and 84 are disposed to engage their contacts B, the video signal Vj for forming the sub-channel picture to be displayed on the screen of tube 53 is derived from the video signal V3 from an external source. Further, when switching circuits 82 and 84 are disposed to engage their contacts C, the video signal Vj for forming the sub-channel picture is derived from the video signal V4 reproduced by the VCR 40.

Therefore, with the arrangement shown in FIG. 1, only a main-channel picture from any one of various sources may be displayed on the screen of picture tube 53 in an exclusively main-channel picture mode of the apparatus, or such main-channel picture from any one of the various sources may be simultaneously displayed with a sub-channel picture, also selected from one of various sources, in a combined picture mode of the apparatus.

If the switching circuits 81, 82, 83 and 84 are engaged with their respective contacts A or B at a time when the recording mode of the VCR 40 is established by a suitable state of the control signal MODE from the system controller 90, the CPU in the microcomputer forming the system controller 90 executes the recording routine 100 according to the flow chart of FIG. 2 so that a recorded operation of the VCR 40 is initiated.

Figure 3A:
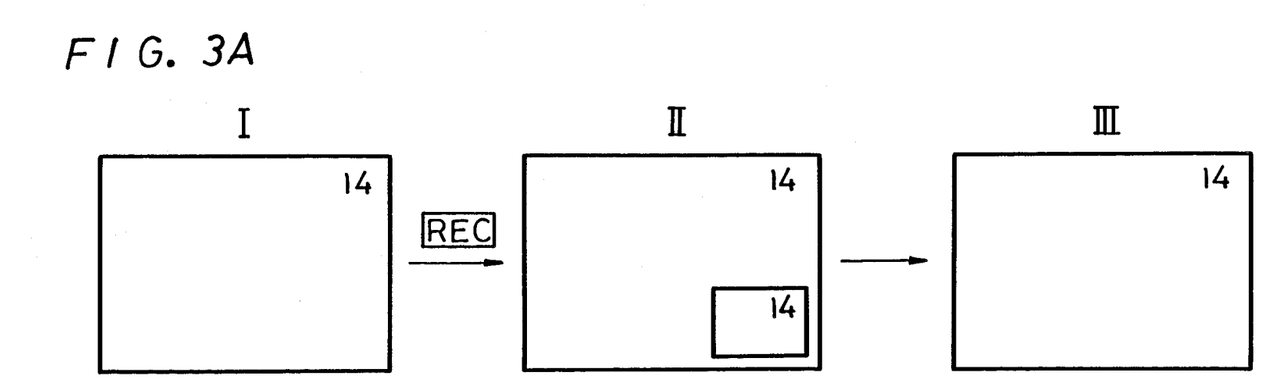
Figure 3B:
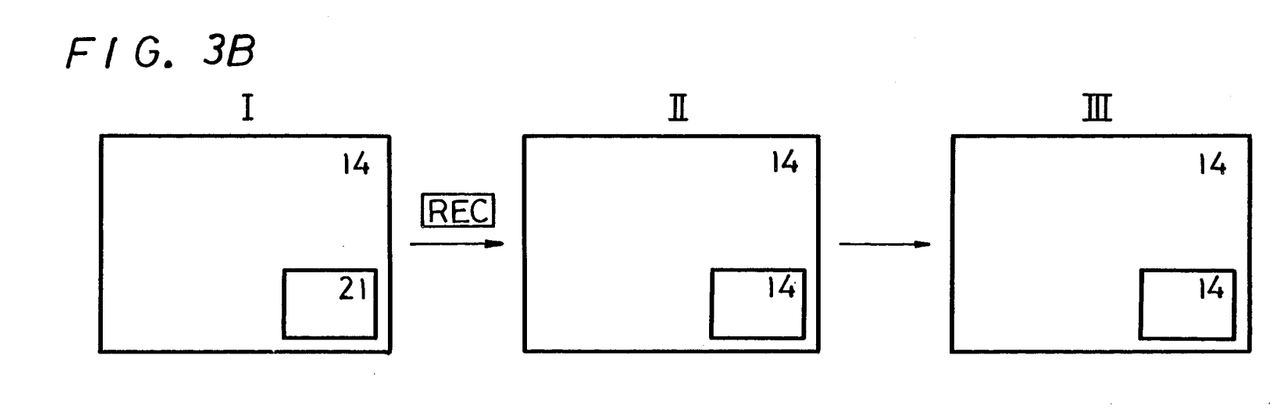

For the purpose of describing such routine, it may be assumed that the switching circuits 81–84 are all engaged with their respective contacts A, and that tuner circuit 11 is operative, in response to the channel selection control signal CHN1, to receive channel "14", while tuner circuit 21 is initially operative, in response to the channel selection control signal CHN2, to receive channel "21". On the basis of the foregoing assumptions, in the exclusively main-channel picture mode of the apparatus, the picture being broadcast on channel "14" will be displayed over the full area of the screen of tube 53 as the main-channel picture, for example, as shown on FIG. 3A-I. Alternatively, in the combined picture mode of the apparatus, the picture being broadcast on channel "14" will be displayed as the main-channel picture extending over the full area of the picture tube screen, and the picture being broadcast on channel "21" will be displayed as the inset sub-channel picture superimposed on a limited area of the main-channel picture, as shown on FIG. 3B-I.

Under either of the above conditions, when a recording switch included among the switches 9A, 9B,–9N is actuated, the CPU in the system controller 90 begins to execute the recording routine 100 commencing at the step 101 on FIG. 2. In the next step 102, the value or data of the control signal CHN2 for determining the channel selected by tuner circuit 21 is made equal to the data of the control signal CHN1 without regard to the channel to which the tuner circuit 21 was previously tuned by the control signal CHN2. Thus, in the example given, the channel selection control signal CHN2 is changed, in step 102, from the value for selecting the channel "21" to the value for selecting the channel "14".

The routine then proceeds to step 103 in which, regardless of the contacts that have been previously engaged by the switching circuits 82 and 84, such switching circuits 82 and 84 are made to engage the same contacts thereof as are engaged by the switching circuits 81 and 83 in response to the control signals SW. Thus, in the example given, the switching circuits 82 and 84 are made to engage their respective contacts A in step 103 even if such switching circuits 82 and 84 had previously engaged other contacts thereof.

As a result of steps 102 and 103, the switching circuits 82 and 84 are made to derive, as the signals Vj and Sj, the signals V2 and S2 that are the video and audio portions of the program being broadcast on channel "14" now selected by the second tuner circuit 21, and which are the same as the signals V1 and S1 representing the video and audio portions of the program being broadcast on the same channel "14" selected by the first tuner circuit 11. As a result of the foregoing, if the apparatus is in the combined picture mode, at the completion of the step 103, the sub-channel picture is the same as the main-channel picture, as shown on FIG. 3B-II.

The routine now proceeds to step 104 in which the recording mode of the VCR 40 is established in response to the recording state of the control signal MODE from the system controller 90. At this point, the VCR 40 commences the recording of the signals V2 and S2 which are selected by the switches 82 and 84 to form the signals Vj and Sj. Thus, the VCR 40 commences recording of the video and audio of the program being broadcast on the channel selected by tuner circuit 21, which, in the described example, is the program being broadcast on channel "14".

At the next step 105, and regardless of whether the apparatus has been previously in its combined picture mode or in its exclusively main-channel picture mode, the signal ENSB from system controller 90 causes composing circuit 52 to establish the combined picture mode, that is, to display the sub-channel picture superimposed on a portion of the main-channel picture, as shown in FIGS. 3A-II and 3B-II. Since, at this time, the signal V2 employed as the signal Vj for forming the sub-channel picture is the same as the signal V2 supplied to the VCR 40 for recording in the latter, it will be apparent that the sub-channel picture permits monitoring of the signal actually being recorded by the VCR. As already noted, in the described example, the sub-channel picture corresponds to the video portion of the program being broadcast on channel "14", and it is the program being broadcast on channel "14" that is being recorded by the VCR 40.

The following step 106 establishes a standby period, for example, of five seconds, whereupon the routine 100 proceeds to a decisional step 107 in which it is determined whether or not the apparatus was in its combined picture mode prior to the initiation of the routine 100, for example, as illustrated in FIG. 3B-I. If the apparatus was not in its combined picture mode prior to the initiation of the recording routine 100, that is, if the sub-channel picture was not then displayed, for example, as in FIG. 3A-I, and as represented by a NO at decisional step 107, the routine proceeds to step 108. In such step 108, the further display of the sub-channel picture is inhibited in response to a suitable state of the control signal ENSB and, as a result thereof, the video signal being broadcast on channel "14", is displayed only as the main-channel picture, as shown on FIG. 3A-III. From step 108, the routine 100 proceeds to step 109 which represents the end of routine 100 for initiating the recording mode. On the other hand, if the apparatus had been in the combined picture mode prior to the initiation of the recording routine 100, that is, if the sub-channel picture had been originally displayed, as in FIG. 3B-I, the resulting YES answer at step 107 would result in the routine going directly to step 109 so that the video of the program being broadcast on channel 14 will continue to be displayed as the sub-channel picture, as well as the main-channel picture, as on FIG. 3B-III, during the continuing of the recording operation.

It will be appreciated from the above description of the routine 100 that, whenever the recording switch included among the switches 9A, 9B,–9N is actuated, and regardless of whether or not the sub-channel picture is being displayed at that time, the value of the channel selection control signal CHN2 is made equal to the then existing value of the channel selection control signal CHN1. As a result thereof, the signal Vj for forming the sub-channel picture as made to be identical to the signal Vi for forming the main-channel picture, that is, the signal Vj is derived from the same channel is the signal Vi, and this video signal Vj is recorded by the VCR 40. Thus, when the recording switch is actuated, the video signal that has been displayed as the main-channel picture is recorded by the VCR 40 without fail with the result that the user can positively ascertain that the desired program is the one being recorded.

Since in accordance with the present invention, the initiation of the recording mode by the routine 100 of FIG. 2 causes the signal Vj to be made identical with the signal Vi in steps 102 and 103, the routine 100 can be easily executed whether or not the tuner circuits 11 and 21 have been previously tuned to the same channel, and whether or not the apparatus was initially in its exclusively main-picture mode, as in FIG. 3A-I, or in its combined picture mode, as in FIG. 3B-I. Moreover, when the routine 100 is initiated, regardless of whether or not the sub-channel picture has been previously displayed, the sub-channel picture is positively displayed in step 105 to present to the operator the picture on the channel then being recorded by the VCR 40 at least for the stand-by period of step 106. Thus, the content of the picture being recorded can be monitored to ensure that the desired channel is being recorded. Of course, routine 100 is limiting to the extent that only the program or picture being displayed can be recorded.

It is desirable that the VCR 40 have a recording pause mode in which the movement of a magnetic tape and the recording thereof can be stopped, for example, during the reception of an unwanted video signal, such as, a commercial or the like. Another advantageous function of such recording pause mode is its use in assemble mode editing in which a video signal earlier recorded on the tape and representing a program broadcast on one channel is to be joined, in series, to a video signal broadcast on another channel.

However, such desirable uses of the recording pause mode can not be realized unless the recording routine 100 described above with reference to FIGS. 1 and 2 is modified or added to in response to the establishment of the recording pause mode. Thus, for example, if a program on one channel, for example, channel "21" selected by the tuner circuit 21, is being recorded while the program on a different channel selected by the tuner circuit 11 is displayed as the main-channel picture, the displaying of the main-channel picture and of the sub-channel picture corresponding to the channel selected by tuner circuit 21 can indicate to the operator of the apparatus the proper time at which the VCR 40 should be released from its recording pause mode, that is, the proper time at which recording should commence again. Without displaying the sub-channel picture representing the program on a channel selected by the tuner circuit 21 to be different from the channel selected by the tuner circuit 11, it is very difficult for the operator to determine the precise time at which the VCR should be released from its recording pause mode.

Further, changing of the picture to be recorded when the VCR is in its recording pause mode is not possible if the channel selected to form the sub-channel picture is made the same as the channel selected to form the main-channel picture and the signal forming the sub-channel picture is, in all cases recorded, as in accordance with routine 100.

Figures 4, 5, 6:
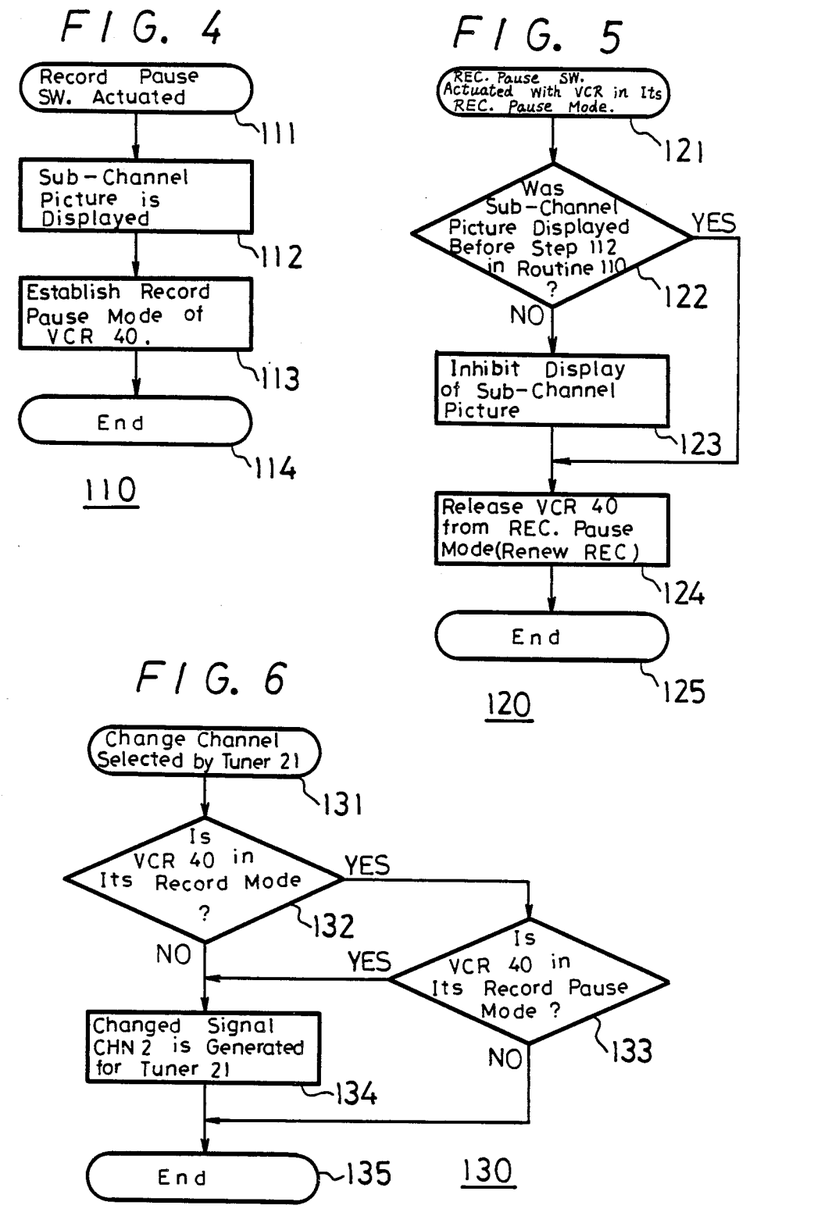
FIG. 4 is a flow chart to which reference will be made in explaining the establishment of a recording pause mode of the video cassette recorder in another embodiment of the invention.
FIG. 5 is a flow chart to which reference will be made in explaining how the video cassette recorder is released from its recording pause mode.
FIG. 6 is a flow chart to which reference will be made in explaining how changing of the channel selected by the tuner for providing the sub-channel picture is inhibited only while the video cassette recorder is in the recording mode.

In order to avoid the foregoing problems associated with the embodiment of the present invention described above with reference to FIGS. 1 and 2, an apparatus according to another embodiment of this invention which is otherwise identical with that shown in FIG. 1 has a ROM in the computer comprising its system controller 90 which provides routines 110, 120 and 130 shown on FIGS. 4, 5 and 6, respectively, in addition to the previously described routine 100 shown on FIG. 2.

When the VCR 40 is performing a recording operation which has been initiated by the routine 100, that is, the video signal Vj being recorded is the program being broadcast on channel 14 selected by the tuner circuit 21, and which is the same as the channel selected by the tuner circuit 11 for forming the main-channel picture, and the display on the picture tube 53 is either that of FIG. 3A-III or that of 3B-III, if a recording pause switch included among the switches 9A, 9B,–9N is actuated, the CPU in the system controller 90 begins to execute the routine 110 (FIG. 4) from the step 111. In the succeeding step 112, the sub-channel picture is displayed in response to a suitable control signal ENSB from the system controller 90 whether such sub-channel picture had been previously displayed, as in FIG. 3B-III, or had not been displayed, as in FIG. 3A-III. In other words, the picture corresponding to the video signal Vj that VCR 40 receives is displayed as the sub-channel picture. Then routine 110 proceeds to step 113 in which the recording pause mode of the VCR 40 is established in response to a corresponding control signal MODE from the system controller 90. After the recording pause mode of the VCR has been established, the routine 110 concludes at step 114.

Thus, during a recording operation of the VCR 40, when the recording pause mode is initiated, the resulting execution of the routine 110 makes it possible to monitor, as the sub-channel picture displayed on tube 53, the picture of the video signal Vj being supplied to the VCR 40 while the latter is in its recording pause mode.

If the recording pause switch is depressed while the VCR 40 is in its recording pause mode, the CPU in the system controller 90 initiates the execution of the routine 120 of FIG. 5 commencing from the step 121. In the succeeding step 121 it is determined whether or not the sub-channel picture had been displayed prior to its display in step 112 of routine 110. In other words, it is determined in step 122 whether, at the conclusion of the recording routine 100 on FIG. 2, and before the execution of the routine 110 for establishing the recording pause mode of the VCR 40, there was only a main-channel picture display, as on FIG. 3A-III, or both a main-channel picture display and a sub-channel picture display, as on FIG. 3B-III. If the sub-channel picture had been displayed prior to the execution of the routine 110, so that the answer to the decisional step 122 is YES, the routine 120 goes directly to the step 124. On the other hand, if the sub-channel picture had not been displayed prior to the routine 110 for establishing the recording pause mode, that is, if the answer at step 122 is NO, the routine 120 proceeds to a step 123 in which the further or continuing display of the sub-channel picture is inhibited in response to a signal ENSB from the system controller 90, whereupon the routine proceeds to step 124.

In step 124, whether attained directly from step 122 or through step 123, the VCR 40 is released from its recording pause mode in response to a suitable control signal MODE from the system controller 90 so that the VCR can commence recording again the signal Vj with either the sub-channel picture being displayed during such renewed recording, as on FIG. 3B-III, or with the display of the sub-channel picture being omitted, as on FIG. 3A-III. It will be apparent that the display or lack of display of the sub-channel picture at this time, that is, at the renewal of the recording operation of the VCR 40, is consistent with the condition of the sub-channel picture display prior to the establishment of the recording pause mode. The routine 120 is shown to end in the step 125.

It will be appreciated from the foregoing that, when the routine 120 is executed, the VCR 40 is released from the record and pause mode and the resulting renewed recording operation of the VCR is effected with the display of the sub-channel picture being returned to the condition thereof before the establishment of the recording pause mode.

If, at any time, a channel selection switch among the switches 9A, 9B,-9N is actuated for causing the second tuner circuit 21 to change the channel selected thereby, the CPU in the system controller 90 executes the routine 130 on FIG. 6 starting from the step 131 thereof. In the succeeding decisional step 132, it is determined by the CPU whether or not the VCR 40 is in its recording mode, that is, whether or not the routine 100 of FIG. 2 has been previously executed. If it is determined in step 132 that the recording routine 100 has not been previously executed, that is, the result of step 132 is NO, the routine 130 proceeds to step 134. In step 134, a suitable channel selection control signal CHN2 is provided by the system controller 90 in accordance with the one of the channel selection switches actuated by the operator, and such changed channel selection control signal CHN2 is supplied to the second tuner circuit 21 so that the channel selected by the latter is appropriately changed. Thereupon, the routine proceeds to step 135 in which the routine 130 is ended.

If it is determined, in the decisional step 132, that the recording routine 100 has been previously effected, the answer to decisional step 132 is YES and the routine 130 proceeds to the decisional step 133. In step 133, it is determined by the CPU whether or not the VCR 40 which has had its recording mode established by the previous execution of the recording routine 100, is at this time in its recording pause mode, that is, whether or not the recording pause mode routine 110 of FIG. 4 has been executed. If the VCR 40 is in the recording pause mode, as represented by a YES in step 133, the routine 130 proceeds to step 134 in which the change of the channel selected by the tuner circuit 21 is again effected. On the other hand, if the VCR 40 is determined, in step 133, not to be in the recording pause mode, the resulting NO output from step 133 causes the routine 130 to proceed directly to the end step 135.

It will be appreciated that, in accordance with the above described routine 130, the second tuner circuit 21 is inhibited from changing the channel selected thereby only when the VCR 40 is actually in its recording mode. However, in other operating modes, of the VCR 21, such as, its recording pause mode, or its recording stop mode, the tuner circuit 21 is free to change the channel selected thereby.

It will be apparent that in the embodiment of the present invention described above with reference to FIGS. 4, 5 and 6, when the VCR 40 is placed in its recording pause mode, the sub-channel picture, that is, the picture corresponding to the video signal Vj, is displayed in accordance with the routine 110 regardless of whether or not the sub-channel picture had been previously displayed. Further, since the picture corresponding to the video signal Vj supplied to the VCR 40 is displayed as the sub-channel picture and can be readily monitored while the VCR is in its recording pause mode, it is possible for the user of the apparatus to readily ascertain the proper time at which the VCR 40 is to be released from its recording pause mode by routine 120 in order to renew the recording operation.

Since the routine 130 inhibits the second tuner circuit 21 from changing the channel selected thereby only while the VCR 40 is in its recording mode, that is, the second tuner circuit 21 can change the channel selected thereby while the VCR is in its recording pause mode, it is possible to freely record a program being broadcast on a channel different from the channel forming the displayed main-channel picture.

Moreover, when the VCR 40 is released from its recording pause mode so as to start the recording operation again, sub-channel picture displayed continues in such renewed recording if there was sub-channel picture display prior to the establishment of the recording pause mode. However, in the renewal of the recording operation by the release from the recording pause mode, as in routine 120, the program does not again include the execution of the routine 100.

In other words, when the recording pause mode is released to permit renewal of the recording operation, the channel selected by tuning circuit 21 is not again made equal to the channel selected by the tuning circuit 11, as in step 102 of routine 100. Thus, if the channel selected by tuner circuit 21 is changed while the VCR 40 is in its recording pause mode, upon the release of such recording pause mode, the recording operation can be renewed so as to record the video signal being broadcast by the changed channel selected by tuner circuit 21, which channel selected by tuner circuit 21 is different from the channel selected by the tuner circuit 11 and forming the main-channel picture.

By reason of the foregoing functional features of the apparatus embodying this invention, an assemble edit operation can be conveniently and accurately performed therewith. Further, such operation involves the manipulation of a minimum number of switches so as to avoid confusion.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A television receiver incorporating a video cassette recorder and having display means for showing a main-channel picture within which a sub-channel picture may be superimposed, comprising:

independently operable first and second tuner circuit means for each selectively tuning to one of a number of broadcast channels;

means for supplying to said display means a video signal broadcast on the one of said channels to which said first tuner circuit means is tuned for forming said main-channel picture;

means causing said second tuner circuit means to select the same one of said broadcast channels as said first tuner circuit means upon initiation of a recording mode of said video cassette recorder;

means for supplying to said video cassette recorder in said recording mode a video signal broadcast on said one of the channels to which said second tuner circuit means is tuned for recording by said video cassette recorder; and means operative in a recording pause mode of said video cassette recorder to supply to said display means a video signal received by said video cassette recorder for forming said sub-channel picture therefrom whether or not a sub-channel picture has been displayed prior to establishment of said recording pause mode.

2. A television receiver incorporating a video cassette recorder as in claim 1; further comprising means for inhibiting changing of the channel to which said second tuner circuit means is tuned only when said video cassette recorder is in said recording mode.

3. A television receiver incorporating a video cassette recorder and having display means for showing a main-channel picture within which a sub-channel picture may be superimposed, comprising:

independently operable first and second tuner circuit means for each selectively tuning to one of a number of broadcast channels;

means for supplying to said display means a video signal broadcast on the one of said channels to which said first tuner circuit means is tuned for forming said main-channel picture;

means causing said second tuner circuit means to select the same one of said broadcast channels as said first tuner circuit means upon initiation of a recording mode of said video cassette recorder;

means for supplying to said video cassette recorder in said recording mode a video signal broadcast on said one of the channels to which said second tuner circuit means is tuned for recording by said video cassette recorder;

first and second source selector switch means having first video inputs for receiving video signals from said first and second tuner circuit means, respectively, second video inputs for each receiving a video signal from an external source, and third video inputs from each receiving a video signal reproduced by said video cassette recorder;

means for supplying an output of said first source selector switch means to said display means for forming said main-channel picture;

means for supplying an output of said second source selector switch means to said display means for forming said sub-channel picture; and means for supplying said output of said second source selector switch means to said video cassette recorder for recording by the latter.

4. A television receiver incorporating a video cassette recorder and having display means for showing a main-channel picture within which a sub-channel picture may be superimposed, comprising:

independently operable first and second tuner circuit means for each selectively tuning to one of a plurality of channels on which respective video signals are broadcast;

signal conveying and processing means interposed between each of said first and second tuner circuit means and said display means for supplying to the latter processed signals corresponding to video signals broadcast on the channels to which said first and second tuner circuit means are respectively tuned and thereby forming said main-channel picture and said sub-channel picture, said signal conveying and processing means having an exclusively main-channel picture mode and a combined main-channel and sub-channel picture mode;

control switch means actuable for selecting the channels to which said first and second tuner circuit means are respectively tuned, and for establishing respective operating modes of said video cassette recorder and of said signal conveying and processing means; and system controller means responsive to said control switch means for providing channel control signals to said first and second tuner circuit means, respectively, and mode control signals to said signal conveying and processing means and to said video cassette recorder, said system controller means being programmed to provide a channel control signal to said second tuner circuit means which is the same as the channel control signal provided to said first tuner circuit means in response to initiation of a recording mode of said video cassette recorder, to convey to said video cassette recorder in said recording mode the video signal broadcast on the channel to which said second tuner circuit means is tuned by the respective channel control signal, and so that, in said recording mode, said signal conveying and processing means supplies to said display means, for forming said sub-channel picture, said processed signals corresponding to the video signal broadcast on the channel to which said second tuner circuit means is tuned whether said signal conveying and processing means is initially in said exclusively main-channel picture mode or said combined picture mode, said system controller means being further programmed so that in a recording pause mode of said video cassette recorder, said signal conveying and processing means continues to supply to said display means, for forming said sub-channel picture, said processed signals corresponding to the video signal broadcast on the channel to which said second tuner circuit means is tuned whether said exclusively main-channel picture mode or said combined picture mode was initially established.

5. A television receiver incorporating a video cassette recorder as in claim 4; in which, when said video cassette recorder is in said recording mode, said system controller means is further programmed to inhibit changing of the channel to which said second tuner circuit means is tuned in response to actuation of said control switch means.

6. A television receiver incorporating a video cassette recorder as in claim 5; in which said system controller means is further programmed to remove the inhibition against said changing of the channel to which said second tuner circuit means is tuned in response to establishing of said recording pause mode of the video cassette recorder.

7. A television receiver incorporating a video cassette recorder and having display means for showing a main-channel picture within which a sub-channel picture may be superimposed, comprising:

independently operable first and second tuner circuit means for each selectively tuning to one of a plurality of channels on which respective video signals are broadcast;

signal conveying and processing means interposed between each of said first and second tuner circuit means and said display means for supplying to the latter processed signals corresponding to video signals broadcast on the channels to which said first and second tuner circuit means are respectively tuned and thereby forming said main-channel picture and said sub-channel picture, control switch means actuable for selecting the channels to which said first and second tuner circuit means are respectively tuned, and for establishing respective operating modes of said video cassette recorder and of said signal conveying and processing means;

system controller means responsive to said control switch means for providing channel control signals to said first and second tuner circuit means, respectively, and mode control signals to said signal conveying and processing means and to said video cassette recorder, said system controller means being programmed to provide a channel control signal to said second tuner circuit means which is the same as the channel control signal provided to said first tuner circuit means in response to initiation of a recording mode of said video cassette recorder, to convey to said video cassette recorder in said recording mode the video signal broadcast on the channel to which said second tuner circuit means is tuned by the respective channel control signal, first and second source selector switch means each having first, second and third video inputs and an output;

means for supplying video signals from said first and second tuner circuit means to said first video inputs of said first and second source selector switch means, respectively;

means for supplying a video signal from an external source to each of said second video inputs;

means for supplying a video signal reproduced by said video cassette recorder to each of said third video inputs;

means for supplying said output of said first source selector switch means to said display means for forming said main-channel picture on the latter; and means for supplying said output of said second source selector switch means to said display means for forming said sub-channel picture on the latter, and to said video cassette recorder for recording therein.

* * * * *